Figure 1:
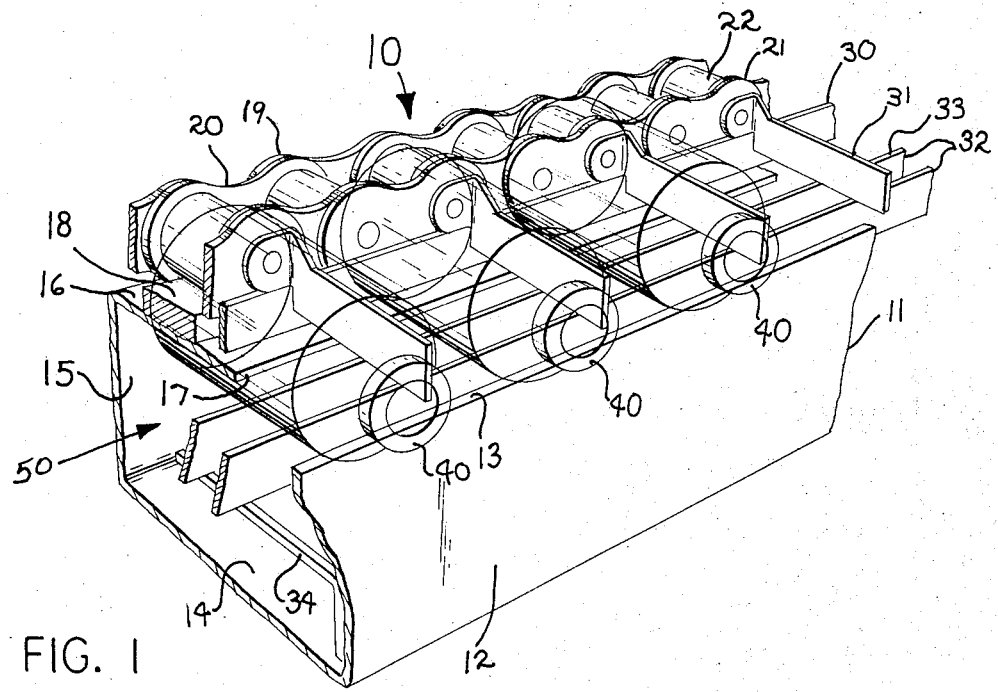

Dec. 19, 1967     O. ZAUNER     3,358,810
ARTICLE HANDLING APPARATUS
Filed June 6, 1966

INVENTOR.
OTTO ZAUNER
BY D.R. Birchall
W.A. Schaich
ATTORNEYS

United States Patent Office 3,358,810
Patented Dec. 19, 1967

3,358,810
ARTICLE HANDLING APPARATUS
Otto Zauner, Vineland, N.J., assignor to Owens-Illinois, Inc., a corporation of Ohio
Filed June 6, 1966, Ser. No. 555,341
2 Claims. (Cl. 198—171)

This invention relates to the handling of containers, and more particularly to a conveyor that will hold small glass containers in precise alignment while they are traveling over the conveyor assembly.

In the manufacture of small glass containers such as bottles, vials, and ampules, they are conveniently transported from one station to another during their manufacture by means of conveyors. The containers are generally of cylindrical configuration and are transported on their sides by being carried along with the conveyor in individual compartments or else they are pushed or rolled along a stationary or moving path or track by arms that are attached to the conveyor. The latter method of transporting glass articles by rolling is often desirable because the frictional forces between the conveyor track and the glass can be quite severe. When glass articles slide over a metal surface, scratches may occur thus marring the surface of the glass and also reducing the ultimate strength of the glass article. A glass container is at its maximum strength just after it has been formed. Subsequent scratches and slight abrasion will reduce the strength of the container to a marked degree. Rolling of glass articles, or for that matter any cylindrical object, so that its longitudinal axis becomes the axis of rotation is advantageous in that various work operations can be performed while the article is actually being rotated and translated. In this manner a minimum amount of friction will occur between the glass article and the apparatus over which it travels. When articles are moved by rolling there has always been the problem that the article does not always remain in true position, that is, the longitudinal axis is not perpendicular to the direction of travel. This problem is even more manifest in very small containers such as those used in the pharmaceutical and electrical industry. If the containers are not in exact alignment so that their longitudinal axis is normal to the direction of travel and also parallel to the surface of the conveyor bed, it is difficult to perform cutting off operations as well as sterilization and sealing. The present invention applies equally well to objects that do not have an axis of revolution or symmetry. Small objects can be transported in a preselected orientation thus facilitating the adherence of labels or other identifying indicia to the exterior of the object that is being conveyed.

It is therefore the principal object of this invention to provide a conveyor which will translate containers so that the longitudinal axis thereof or any other preselected part thereof will remain in constant orientation with respect to the conveyor.

A further object of the instant invention is to provide a conveyor that will hold a small glass container in relatively exact position while it is being translated and rotated through a series of work stages.

An additional object of this invention is to provide a conveyor that will hold objects in a predetermined lateral position while they are being transported along the conveyor.

Another object of this invention is to provide a conveyor that will hold a small glass container in relatively exact lateral position while it is being translated and rotated through a series of work stages.

Another object of this invention is to provide a conveyor for small glass bottles and the like wherein the holding means does not damage the finish on the glass surface.

An object of the present invention is to provide a conveyor wherein the alignment force can be varied without harming the glass article.

Briefly, one example of the present invention comprises a conveyor for translating small containers or objects and at the same time causing them to rotate about their longitudinal axis. The containers are kept in alignment normal to the direction of travel and also maintained so that their longitudinal axis is generally parallel to the bed of the conveyor. A chamber is provided below the bed over which the container moves. By causing a reduced pressure in the chamber below the containers air is forced against and around the containers thus holding them in precise alignment. A further embodiment is characterized by a reduced pressure zone at the side or end of the translated object thus accurately positioning it in a lateral direction as well as the normal direction heretofore described.

Further objects and advantages of the invention will become apparent from the following detailed description when taken in conjunction with the accompanying drawings which form an integral part of the specification.

Figure 2:
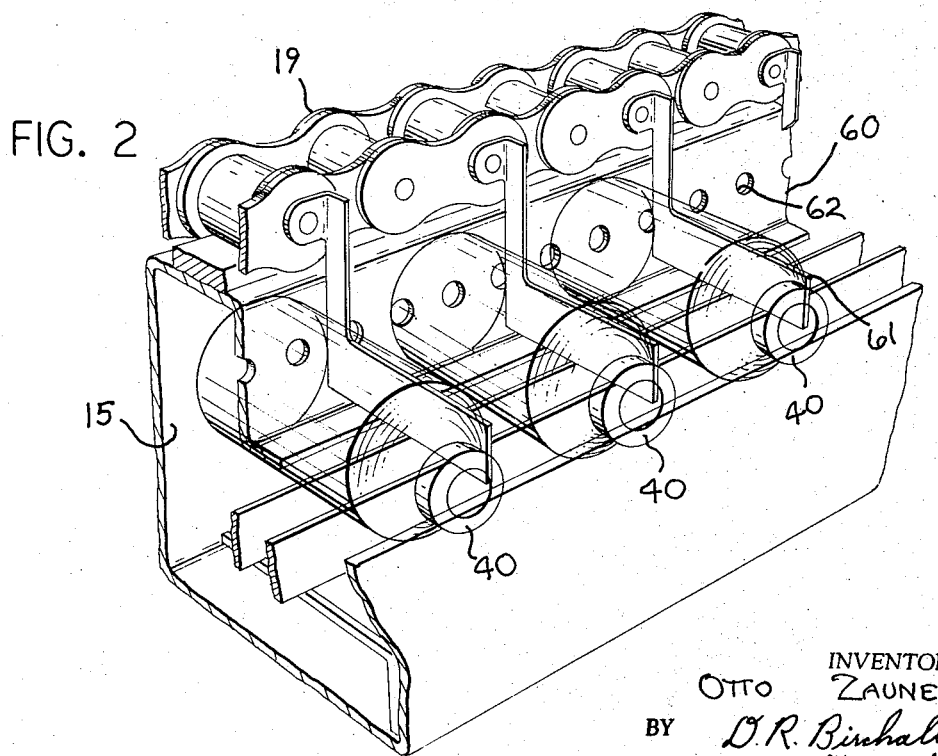

FIG. 1 is a perspective view of a portion of a conveyor for transporting cylindrical articles; and FIG. 2 is a perspective view similar to FIG. 1 except that a lateral positioning means is shown.

For the purpose of setting forth the invention and not by way of limitation, the conveyor will be described in terms of conveying small glass bottles of cylindrical configuration. However, it will be readily apparent that the present apparatus can be adapted for conveying nearly any size or shape of article from one work station to another.

Referring now to FIG. 1, the overall conveyor assembly is shown generally at 10. Only a portion is shown since the power means and support structure associated with the conveyor are considered to be of conventional design and not a part of this invention. A box-like structure 11 serves as part of the support structure of the conveyor. A front wall 12 provides vertical rigidity and also terminates with an upper edge 13 that serves as a part of the track over which the conveyed article is moved. A bottom panel 14 connects the front wall 12 with rear wall 15. Rear wall 15 is similar to front wall 12 except that it is attached to top plate 16 which forms a part of the attachment deck for the conveyor. Top plate 16 has a free edge 17 that is in spaced relationship with upper edge 13 of front plate 12. Thus it can be seen that the distance between edges 17 and 13 can be varied according to the particular requirements of the conveyor and the articles carried thereon. Located adjacent top plate 16 is a track 18 for positioning link chain 19. Track 18 is a width selected to fit conveniently between innermost links 20 of link chain 19. Thus it can be seen that link chain 19 can move freely along track 18 without undue lateral movement occurring. Between the edge of track 18 and the free edge 17 of top plate 16 is a vertically disposed backstop member 30 which is preferably attached to top plate 16. Backstop 30 prevents the articles carried by conveyor assembly 10 from coming into contact with the moving parts of link chain 19. Backstop 30 may be constructed of or coated with a non-abrasive material to further insure against marring or damaging the surface of the articles that are being transported.

Attached to link chain 19 are push rods 31 which urge glass containers such as 40 along the conveyor path. Push rods 31 are cantilevered from outer links 21 of link chain 19. Rods 31 can be anchored to the fastener which with the aid of spacer 22 keeps chain 19 together. Push rods 31 are oriented so that they are perpendicular to the direction of travel of the conveyor. Rods 31 can of course be of non-linear configuration and can be if necessary positioned at an angle with respect to the direction of travel when non-symmetrical objects are moved along the conveyor bed or path. Rods 31 may be constructed or coated so as to prevent harmful abrasion from occurring to the glass articles that are urged from station to station.

There are many operations such as final forming or cut-off where it is desirable that the glass containers undergo a rotation as it is being translated. If glass bottles 40 are translated only by means of push rods 31, the bottles may not rotate freely at all times. This could be detrimental for operations such as flame cutting or the removal of an extended portion of the bottle. In order to facilitate a uniform rotation of bottles 40, bands 32 have been positioned beneath bottles 40 so that the top surfaces 33 thereof are just slightly higher than the top edge 13 and the top surface of top plate 16. In this manner when bands 32 are caused to move in a direction opposite to the direction of travel of link chain 19, bottles 40 will rotate with a very even angular velocity while they are being translated. The bands 32 need not necessarily move in a direction opposite to that of the conveyor. In some instances, it may be desirable to have the bands move along with the conveyor at the same velocity or even at a greater or lesser velocity. The above described movement of the bands becomes particularly important when the objects being translated by the conveyor are of a non-symmetrical configuration that does not lend itself to rotation about a particular axis. One band can be elevated with respect to the other band thus causing the ware to move in a lateral direction toward the backstop. Thus, it is evident that the instant invention will work in instances where the objects are pitched. A support structure 34 is shown beneath bands 32, however any similar structure will work so long as the bands continue to impart a constant interruption free angular velocity to bottles 40.

During the course of translating small bottles 40 from one work station to another they have a tendency to move out of strict alignment with respect to their direction of travel. The small size of the bottles coupled with their small weight often cause an irregular movement to occur, therefore this invention purports to overcome this serious behavior in the following manner. As can be seen from FIG. 1 there is an opening or space from the outside down around bands 32 into the chamber 50 created within box-like structure 11. A reduced pressure is created within chamber 50 by the attachment of a vacuum pump or similar device to one end thereof. Air from the surrounding area adjacent to the bottles will be drawn into chamber 50 thus exerting a force against bottles 40. The force thus created is sufficient to insure that each bottle will remain exactly perpendicular to the direction of its travel, or in any other predetermined position. In addition to remaining perpendicular to the direction of travel, the longitudinal axis of each bottle will remain in a horizontal position thus greatly facilitating any operation that may be necessary to perform on the bottle subsequent to its initial manufacture.

FIG. 2 is a perspective view similar to FIG. 1 in that a vacuum chamber is partially situated below the link chain mechanism that propels the bottles along its course. The embodiment of FIG. 2 differs in that the back wall 15 has been extended in height so that an intermediate vertical wall 60 can serve as a backstop for bottles 40 in a manner similar to backstop 30 of FIG. 1. Chain 19 can be positioned conveniently on top of the vacuum chamber and push rods 61 can extend downward from chain 19 to urge bottles 40 along flight traversed by the apparatus. In the intermediate wall 60 are apertures 62 which are in communication with the outside as well as the interior of the vacuum chamber.

During the operation of the embodiment depicted in FIG. 2, the air from the outside not only brings the longitudinal axis of bottles 40 into precise alignment both perpendicularly and horizontally with respect to the conveyor, but also the bottle is held in exact lateral position. The exact lateral position of bottle 40 is achieved by indexing the bottom of the bottle against the front surface of intermediate wall 60. The apertures 62 and the reduced pressure therebeneath provide the required indexing force. Thus it can be seen that very precise flame cutting or other operations can be performed on the top end of the small bottles.

Throughout the above discussion, the invention has been set forth in terms of an object that possesses an axis of symmetry. The invention has been set forth in this manner so that it could be readily understood. As mentioned before, small objects of nonuniform geometry can equally well be translated by applicant's invention.

While certain representative embodiments and details have been shown for the purpose of illustrating the invention, it will be apparent to those skilled in this art that various changes and modifications may be made therein without departing from the spirit or scope of the invention.

What is claimed is:

1. An article handling apparatus including a conveyor with article urging means attached thereto, article support means positioned adjacent the path over which a plurality of articles traverse, a substantially enclosed chamber for generating a reduced pressure positioned adjacent said support means and longitudinally aligned therewith, the opening of said chamber adjacent the path over which said articles traverse, so that the ingress of air into said chamber will maintain said articles in a selected position while said articles are being translated, said chamber having a plurality of openings wherein at least one air ingress opening into said chamber is positioned beneath the articles being transported so as to force said articles downward when a reduced pressure is generated within said chamber and at least one air ingress opening into said chamber positioned at the side of the articles being transported so as to force said articles in a lateral direction under the influence of a reduced pressure in said chamber.

2. An article handling apparatus including a conveyor with article urging means attached thereto, article support means positioned adjacent the path over which a plurality of articles traverse, said urging means positioned in spaced-apart relationship with respect to said article support means, a substantially enclosed chamber for generating a reduced pressure positioned adjacent said support means and longitudinally aligned therewith, at least one air ingress opening into said chamber positioned beneath the articles being transported so as to force said articles downward when a reduced pressure is generated within said chamber and at least one air ingress opening into said chamber positioned at the side of the articles being transported so as to force said articles in a lateral direction under the influence of a reduced pressure in said chamber.

References Cited

UNITED STATES PATENTS

| 2,298,614 | 10/1942 | Carroll | 198—33 |
| 2,356,485 | 8/1944 | Webb | 198—161 |
| 2,856,058 | 10/1958 | Todd et al. | 198—33 |
| 2,984,331 | 5/1961 | Bradford | 198—33 |
| 3,197,201 | 7/1965 | Craig | 198—190 X |

EVON C. BLUNK, *Primary Examiner.*

M. L. AJEMAN, *Assistant Examiner.*